United States Patent [19]

Daffron

[11] 4,090,099

[45] May 16, 1978

[54] POINT SENSOR MOUNTING APPARATUS

[75] Inventor: Vernon M. Daffron, Ellisville, Mo.

[73] Assignee: Wagner Electric Corporation, Parsippany, N.J.

[21] Appl. No.: 672,487

[22] Filed: Mar. 31, 1976

[51] Int. Cl.² .......................................... H02K 21/26
[52] U.S. Cl. .................................. 310/168; 188/181 R
[58] Field of Search ................ 310/168, 155; 324/173; 188/181 R

[56] References Cited

U.S. PATENT DOCUMENTS

| 3,745,392 | 7/1973 | Phoenix et al. | 324/173 X |
| 3,761,751 | 9/1973 | Fink et al. | 310/168 |
| 3,793,545 | 2/1974 | Leiber et al. | 310/168 |
| 3,890,517 | 6/1975 | Marsh et al. | 310/168 |
| 3,911,302 | 10/1975 | DeClaire | 310/168 |
| 3,979,617 | 9/1976 | Thom | 310/168 |

Primary Examiner—Donovan F. Duggan
Attorney, Agent, or Firm—Eyre, Mann, Lucas & Just

[57] ABSTRACT

A non-elastomeric sensor holding fixture using metal-to-sensor contact friction in a wheel slip control system maintains a wheel speed sensor in intimate contact with an exciter wheel without the excessive sensor wear which otherwise happens when the wheel speed sensor is held in place with resilient elastomeric holder. The use of metal-to-sensor frictional contact in the holding fixture avoids the hardening and seizing normally occurring in elastomeric-to-sensor frictional contact due to time and allows readjustment of sensor position after extended use.

10 Claims, 7 Drawing Figures

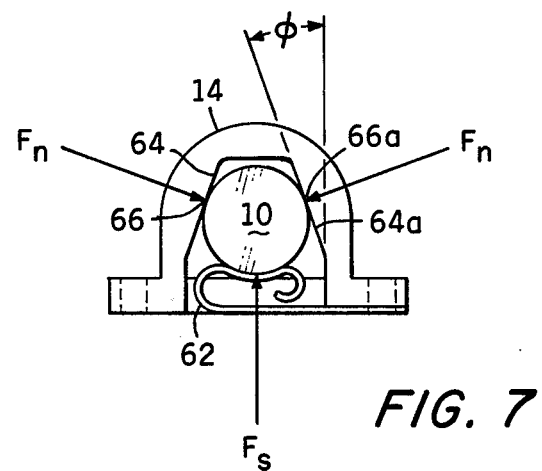

POINT SENSOR MOUNTING APPARATUS

BACKGROUND OF THE INVENTION

Federal Regulations and the general requirements for safety in highway transportation have created the need for systems which will not only reduce the stopping distance of a rubber-tired vehicle, but also will prevent loss of directional control during maximum stopping.

It has long been known that a rubber tire has maximum tractive force or "grip" on the road when it is pushed beyond the state of simple static traction, but not so far as to lose all its "gearing" with the road surface. This range of maximum traction occurs when the tire angular speed is below the corresponding linear speed of the vehicle, i.e., when there is some degree of wheel slip. On most surfaces, it has been found that maximum tractive forces occur when the tire angular speed is at least 10 percent lower than the angular speed at which the tire would be in synchronization with the linear vehicle speed. Therefore, on any given road surface, the shortest stop possible can only be made if this condition is achieved. This condition, the wheel rotating below synchronization speed, is very difficult to obtain even by a very experienced test driver. Road friction variations, vehicle loading and brake sensitivity and stability are several of the major reasons why this condition is so difficult to obtain. Therefore, most drivers brake in such a manner that the vehicle wheels are either synchronized to vehicle speed or completely locked. Both these situations may result in a straightline stop, but there are exceptions. Generally, braked wheels that are synchronously rotating throughout the entire stop will give straightline stops. Theoretically, locked wheels should also give straightline stops, but frequently do not in actual practice because brakes do not always lock-up at the same time. The small initial angular impulse resulting from non-simultaneous lock-up starts the vehicle rotating as it slides. As the center of gravity shifts further and further off center, inertial forces continue to rotate the vehicle. A rotational deviation of approximately 20° between the vehicle centerline and vehicle direction vector makes it almost impossible to regain control. Therefore, maximum controllability can only be achieved with rolling wheels.

These objectives are approximated using systems which sense an incipient wheel slid and thereupon momentarily reduce brake pressure until the wheel spins up to rolling speed; then reapply brake pressure until the incipient skid is again sensed. This brake pumping is automatically continued during the stop; the driver merely keeping firm pressure on the brake pedal. A typical wheel slip control system of this type is described in U.S. Pat. No. 3,857,760 entitled "Wheel Slip Control System For Automotive Vehicles And The Like", granted Aug. 6, 1974 in the name of Joseph E. Fleagle and assigned to the Wagner Electric Corporation, assignee of the present invention.

The wheel slip control systems for automotive vehicles, described in preceding paragraphs, depend on accurate monitoring of wheel speed to provide the basic input with which to calculate whether wheel slipping is occurring, when to apply correction to the braking pressure, and when to stop applying correction. One of the most convenient sensors from a production and maintenance standpoint consists of a stationary sensor retained in intimate contact with a rotating slotted or waffle-like surfaced tone wheel. The tone wheel consists of alternate ferrous metal bars and openings or peaks and valleys such that, when the bars and openings are moved past the sensor, the varying magnetic path seen by the sensor causes an electric signal to be induced in the sensing coil. The frequency of the signal in the sensing coil is proportional to the speed of the wheel as follows:

$$F = RPM/60 \times K$$

Where:
 $F$ = frequency (cycles per second)
 $RPM$ = wheel revolution per minute
 $K$ = number of slots in tone wheel Adequate signal amplitude requires that close proximity be maintained between sensor and tone wheel. The required close proximity is usually achieved, beginning with the vehicle wheel hub removed from the vehicle, by sliding the sensor outward in its holding fixture, then installing and tightening the vehicle wheel hub, containing the tone wheel, on the axle. In the process of installing the vehicle wheel hub, the tone wheel is brought into contact with the sensor and presses the sensor back into its holding fixture as the wheel hub is tightened in place. When the vehicle wheel hub is fully installed, the tone wheel and sensor are in intimate rubbing contact. During subsequent operation of the vehicle, the face of the sensor becomes ground off by rubbing contact until a final close non-rubbing, proximity is achieved.

Sensors have heretofore been slidably retained in their holding fixtures using resilient elastomeric bushings. When the sensor is pushed back into its holding fixture during mounting of the wheel hub, the resilient bushing holds the sensor in place but also provides a spring-back force. As the faces of the sensor and tone wheel are ground away through rubbing contact, the spring-back force continues to press the face of the sensor against the tone wheel. As a consequence, the face of the sensor continues to lose material until the spring-back force of the resilient bushing is exhausted. This results in excessive wear on the sensor.

In addition, available elastomeric materials tend to harden and seize on the barrel of the wheel speed sensor after extended use. When the elastomeric bushing is so severely seized that the wheel speed sensor cannot be freed from it, no maintenance adjustment of sensor and tone wheel proximity is possible. At times, although the wheel speed sensor can be freed from the hardened elastomeric bushing, the hardened bushing is thereafter unable to adequately hold the wheel speed sensor.

SUMMARY OF THE INVENTION

The present invention provides a non-resilient holding fixture for a wheel speed sensor using normal spring force and metal-to-sensor contact. When the sensor is forced back into the holding mixture by pressure of the tone wheel during installation and tightening of the wheel hub, little or no resilient spring-back force is generated. Consequently, only a small amount of material is abraded from sensor during the initial run-in after wheel hub installation.

It is an object of this invention to provide a non-resilient holding fixture for a wheel speed sensor which will exhibit no resilient spring-back.

It is a further object of this invention to provide a holding fixture for a wheel speed sensor which provides a predetermined known frictional resistance to physical motion of the wheel speed sensor into and out of its holding fixture.

It is a further object of this invention to prevent excessive removal of wheel speed sensor face material during initial run-in after vehicle wheel installation.

It is a further object of this invention to provide a wheel speed sensor holding fixture which maintains close proximity between wheel speed sensor and tone wheel.

It is a further object of this invention to provide a wheel speed sensor holding fixture which maintains substantially constant frictional resistance to sliding motion between the wheel speed sensor and the sensor holding fixtures unaffected by age or temperature.

Additional objects of the invention will become apparent to one skilled in the art by reading the detailed description of the preferred embodiment.

BRIEF DESCRIPTION OF THE DRAWINGS

In the drawings which illustrate embodiments of the present invention and wherein like numerals refer to like parts wherever they occur:

FIG. 7 illustrates a force diagram showing forces acting on a sensor body 10.

DETAILED DESCRIPTION OF THE PREFERRED EMBODIMENT

Figure 1:
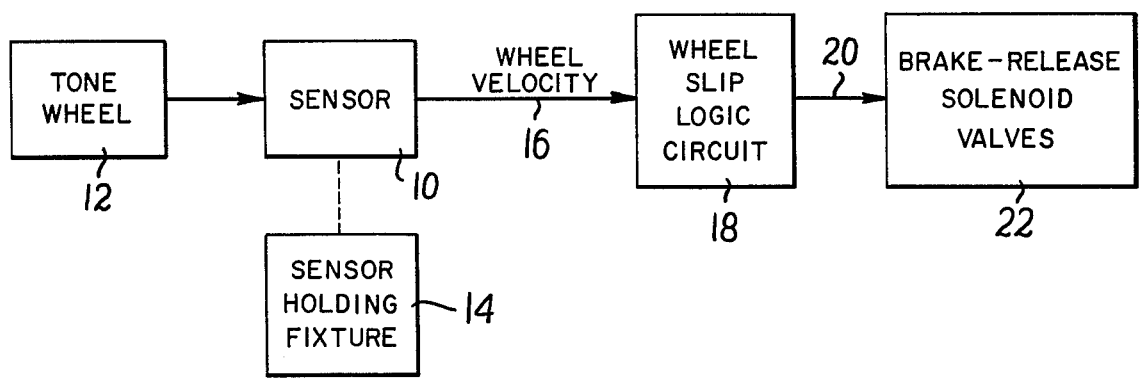
FIG. 1 is a block diagram of a typical wheel slip control system for automotive vehicles and the like showing the relationship between wheel speed sensor, tone wheel and holding fixture, and the logic and brake-release solenoid valves.

Referring to FIG. 1, a stationary wheel speed sensor 10 is maintained by a non-resilient sensor holding fixture 14 in intimate proximity to a tone wheel 12 which rotates with the vehicle wheel. As the vehicle wheel with the attached tone wheel 12 rotates, alternate bars of ferrous metal and openings in the tone wheel 12 pass the face of the sensor 10. As a consequence of the varying magnetic permeability at the face of the sensor 10, an electrical wheel velocity signal 16, whose frequency is proportional to the vehicle wheel speed, is generated in the wheel speed sensor 10. The wheel velocity signal 16 provides the basic input to a wheel slip logic circuit 18. The wheel slip logic circuit 18 may operate on the wheel velocity signal 16 in a number of ways to generate a brake-relief signal 20 output. One type of wheel slip logic circuit 18 compares the rate of change of wheel velocity to a threshold value and, when the threshold is exceeded, generates the brake-relief signal 20. Another type compares the rate of change of wheel velocity to a threshold and also compares the increment of velocity change after a datum point with a fixed or variable threshold and, when both thresholds are simultaneously exceeded, generates the brake-relief signal 20.

However it is generated, the brake-relief signal 20 consists of one or more levels of brake-relief command which causes one or more brake-relief solenoid valves 22 to modulate the application of braking pressure. The brake-relief solenoid valve 22 may alternatively or in combination: (a) reduce the rate of increase of braking pressure, (b) slowly reduce braking pressure, or (c) sharply reduce braking pressure in response to varying combinations of brake-relief signals 20.

Figure 2:
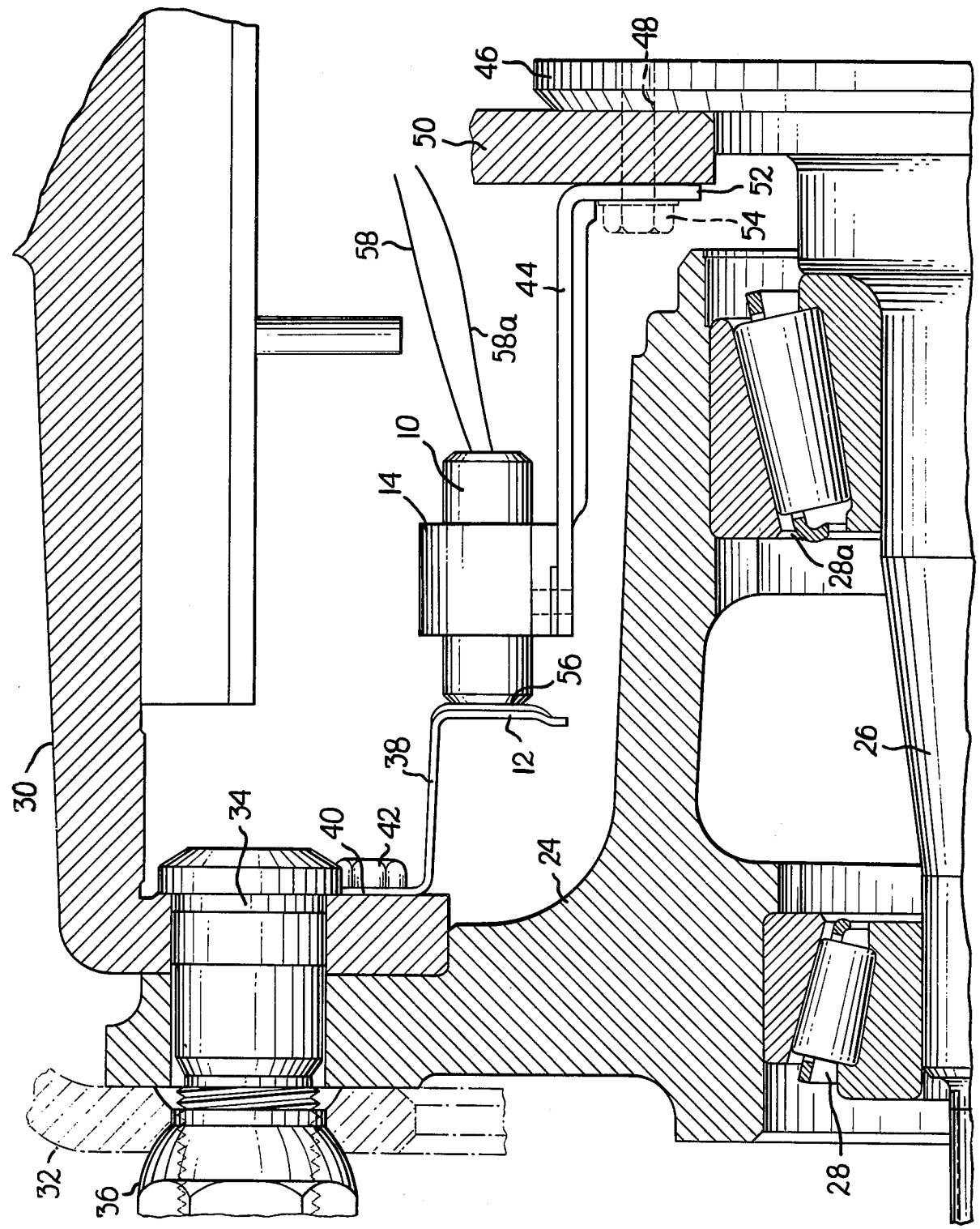
FIG. 2 shows a schematic view in partial cross-section of the upper half of a vehicle wheel showing the mounting relationship between vehicle wheel, tone wheel, sensor, and sensor holding fixture.

Referring now to FIG. 2 for the method of assembly of the holding fixture in a vehicle wheel; a wheel hub 24 is shown rotatably mounted on a vehicle axle 26 using tapered roller bearing assemblies 28, 28a. A brake drum 30 and vehicle wheel 32 bolted to the wheel hub using a plurality of wheel studs 34 and nuts 36. The tone wheel assembly, indicated generally at 38, has a mounting flange 40 whereby the tone wheel assembly is bolted to the rotatable brake drum 30 and wheel hub 24 using a plurality of bolts 42 spaced about the perimeter of the mounting flange 40. The tone wheel 12 on the inboard side of the tone wheel assembly 38 thus is enabled to rotate with and concentric to the vehicle wheel 32.

A bracket 44 is bolted to the non-rotating spindle flange 46 using a bolt 48 which extends through a brake backing plate 50 and an inboard flange 52 of the bracket 44. A nut 54 secures the inboard flange 52, and brake backing plate 50 to the spindle flange 46. The sensor holding fixture 14 is mounted on the outboard end of the bracket 44. The generally cylindrical wheel speed sensor 10 is frictionally retained in the center of the sensor holding fixture 14 in such a position that its face 56 is in intimate proximity to the tone wheel 12. Signal wires 58, 58a carry the electrical signal whose frequency varies in proportion to wheel speed, to the logic circuits of the wheel slip control systems.

The sensor 10 position in intimate proximity to the tone wheel 12 is established during installation of the wheel hub 24. With the wheel hub 24 including the attached tone wheel assembly 38 removed, the wheel speed sensor 10 is pressed outward against the frictional resistance of the sensor holding fixture 14 to the outward limit of its travel. As the wheel hub 24 is installed on the axle 26 it, and the attached tone wheel assembly 38, are moved inward. The tone wheel 12 presses inward on the face 56 of the wheel speed sensor 10 moving the wheel speed sensor 10 inward against the frictional resistance of the sensor holding fixture 14. When the wheel hub 24 is fully installed, the tone wheel 12 remains in intimate rubbing contact with the face 56 of the wheel speed sensor 10. The sensor holding fixture 14 provides sufficient fractional resistance to motion that the sensor 10 remains substantially undisturbed until the next time the wheel hub 24 is removed for any reason. After removal of the wheel hub 24, the procedure just described is repeated to attain correct adjustment of the wheel speed sensor 10 position.

Figure 3:
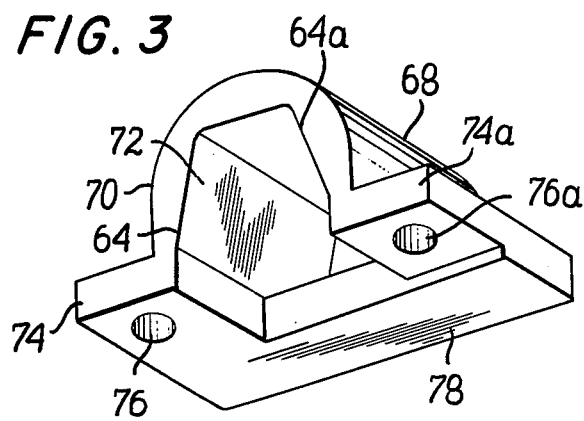
FIG. 3 shows an end view of the wheel speed sensor assembled into the sensor holding fixture illustrating the manner in which the frictional resistance to sensor motion is attained.

Referring now to FIG. 3, the sensor holding fixture 14 is preferably of a metallic material such as aluminum and body 68 includes an outer surface 70 of partially cylindrical shape. An axial cavity 72 is located within the holding fixture body 68. The axial cavity is generally of an inverted U shape with the side walls of the U 64, 64a sloping inward toward the closed end of the U. Two mounting flanges 74, 74a are connected at an angle to the holding fixture body 68. Each of the mounting flanges 74, 74a is pierced with at least one mounting hole 76, 76a for bolting the sensor holding fixture in place. A stiffener 78, bridging the arms of the holding fixture body 68 improve the rigidity of the holding fixture body.

Figure 4:
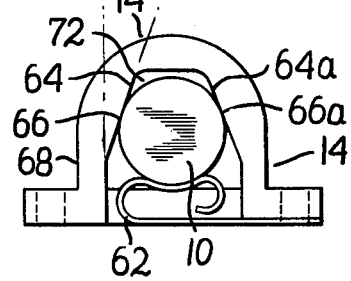
FIG. 4 shows a detailed view of the sensor holding fixture.

Referring now to FIG. 4, pressure spring 62 maintains a spring force $F_s$ upward against the body of the wheel speed sensor 10 mounted within the cavity 72 of the holding fixture body. The two walls 64, 64a of the axial cavity slope inward from the vertical by the angle $\phi$. The sensor 10 being pushed upward by the pressure spring 62 bears against each of the two sloping walls 64, 64a at bearing points 66, 66a with a normal force $F_n = (F_s/2 \sin \phi)$. The total frictional resistance to sensor motion is thus:

$$R_f = F_n \mu_1 / \sin\phi + F_s \mu_2$$

Where:

$R_f$ = frictional resistance to sensor motion;
$\mu_1$ = static coefficient of friction between sensor 10 and sensor holding fixture 14 at one bearing point 66 or 66a;
$\mu_2$ = static coefficient of friction between sensor 10 and pressure spring 62;
$F_n$ = the normal force acting on sensor 10 at bearing points 66, 66a, as illustrated in FIG. 7;
$F_s$ = the spring force exerted on sensor 10 by spring 62 as illustrated in FIG. 7; and
$\phi$ = the angular deviation of walls 64, 64a, from the vertical as illustrated in FIG. 7, (angle $\theta$ not critical).

Note that with the possible exception of very slight sideways resilient deflection of the prssure spring 62 as the sensor 19 is urged inward during initial adjustment, there are no elements available in the sensor holding fixture 14 to maintain resilient longitudinal pressure on the sensor 10 after it is pressed into place as previously described.

The contact between the sensor 10 and the assembled sensor holding fixture 14 is along three lines of contact; two along the bearing points 66, 66a with the sloping inner walls 64, 64a and the third along the pressure spring 62. The lines of contact provided by angle $\phi$ of the walls 64, 64a and of the spring force $F_s$, give the desired frictional resistance to sensor 10 longitudinal motion. In addition, the frictional resistance $R_f$ is not significantly variable with time or temperature. The sensor can be readily readjusted after an extended period of use in contrast to the usual seizing experienced with retention using resilient bushings.

Figure 5:
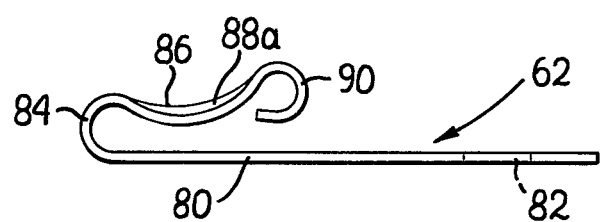
FIG. 5 illustrates a preferred form of spring retainer for the sensor holding fixture.

FIG. 5 illustrates the preferred shape of the pressure spring 62 in side elevation. The pressure spring 62, fabricated of flat spring strip material, has a flat base 80 containing at least one mounting hole 82. The mounting hole 82, as illustrated, is positioned to coincide with at least one of the mounting holes 76, 76a in the mounting flange 74, 74a of the holding fixture body 68. In the embodiment shown, the pressure spring 62 is rigidly secured in position using the same bolt (not shown) which is employed to attach the holding fixture body 68 to the bracket 44. It is to be understood that alternative methods of mounting the pressure spring 62, such as riveting, welding, or securing with bolts through dedicated holes, shall not represent a departure from the scope of this invention. At the end of the flat base 80 which is remote from the end containing the mounting hole 82, the spring 62 is bent on a radius of more than two times material thickness and less than 10 times material thickness to form a first reflex curve 84. The angle of the first reflex curve is between 90° and 180°. The angle illustrated is 160°. When installed, the pressure of the sensor 10 on the pressure spring 62 increases the angle to approximately 180°. In this way, the force exerted by the pressure spring 62 in the assembled condition is directed approximately normal to the flat base 80. A saddle portion 86 in the reflex portion of the pressure spring 62 is adapted to bear against the sensor 10. The outline of saddle portion 86 is concave as seen from the top in order to provide a stable bearing point for the sensor 10. A lip 88, 88a is bent downward at the edges of the saddle portion 86 both to prevent gouging and sticking of the sensor 10 and to enable easier insertion of the sensor 10.

A second reflex curve 90 terminates the reflex portion of the pressure spring 62. The first and second reflex curves 84, 90 combined with the curve and lips 88, 88a in the saddle portion 86, tend to prevent deformation of the saddle portion 86 under pressure, and, tend to transfer applied pressure into deformation of the first reflex curve 84.

Figure 6:
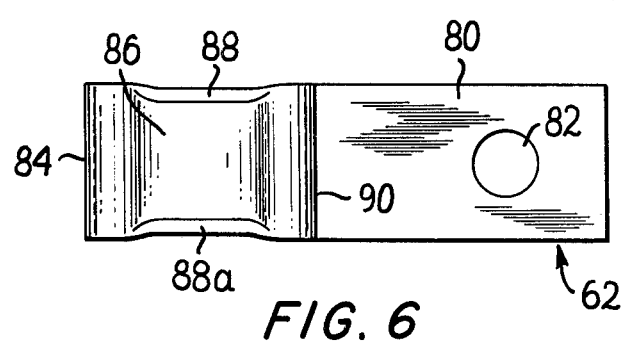
FIG. 6 illustrates a plan view of the spring of FIG. 5.

FIG. 6 further illustrates the pressure spring 62 in plan view. The saddle portion 86 is seen bounded and stiffened on the sides by the two lips 88, 88a, and on the ends by the two reflex curves 84, 90. The mounting hole 82 is positioned in the middle of the width of the flat base 80.

FIG. 7 illustrates sensor holding fixture 14 having sensor 10 mounted therein. Spring force $F_s$ exerted by spring 62 acts vertically upward on sensor 10 and normal force $F_n$ acts on sensor 10 at points 66, 66a where sensor 10 is in bearing contact with walls 64, 64a at an angular deviation $\phi$ from the vertical.

The foregoing has illustrated a means for retaining a sensor preferably without the use of elastomeric retainers by using instead, a metallic retainer engaging the sensor at various points about its circumference rather than fully embracing the sensor circumference so as to avoid the problem of seizing known to occur in prior sensor/retainer arrangements.

It is to be understood that the foregoing description is not intended to limit the scope of the invention to the precise structures shown. Instead, it is to be understood that all reasonable equivalents to the described apparatus are included within the scope of the invention. For example, a single flat pressure spring or multiple springs may be substituted for the reflex pressure spring 62 shown in the preferred embodiment. Other sensor holding fixture 14 body shapes holding arrangements can be substituted without departing from the scope of the invention.

What is claimed is:

1. In a wheel slip control system for automotive vehicles having a tone wheel, wheel speed sensor, wheel slip logic circuit and brake-relief solenoid valve, the improvement comprising:

a holding fixture body containing a cavity therethrough;

support means for retaining said holding fixture body in a fixed position adjacent to a rotatable tone wheel within the hub of an automotive wheel;

a wheel speed sensor within the cavity in said holding fixture body;

a resilient metallic pressure means attached to said holding fixture body for applying force on the surface of and substantially normal to the axis of said generally cylindrical wheel speed sensor; and wherein the cavity in said holding fixture body is generally an inverted U-shape with the legs of the U tapering inward from the vertical by a predetermined angle.

2. The system of claim 1 wherein said metallic pressure means is a flat spring.

3. The system of claim 2 wherein:
the metallic pressure means urges the sensor into contact with the body at a plurality of body/sensor interface points.

4. The system of claim 3 wherein:
a frictional resistance to sensor motion in the cavity results from contact between the metallic pressure means and the sensor and between the body and the sensor in accordance with the formula: $R_f = F_s \mu_1/\sin \phi + F_s\mu_2$ Where:
$R_f =$ frictional resistance to sensor motion;
$\mu_1 =$ static coefficient of friction between the sensor and the holding fixture;
$\mu_2 =$ static coefficient of friction between the sensor and the metallic pressure means;
$F_s =$ force applied by the metallic pressure means on the sensor; and
$\phi =$ the predetermined angle of taper of the legs of the U-shaped cavity.

5. A sensor mounting apparatus comprising:
a holding fixture body containing a cavity therein, the cavity having a first geometric cross-section;
a wheel speed sensor mounting in the cavity, the sensor having a second geometric cross-section different from the first cross-section;
resilient means mounted with the holding fixture body for urging the sensor into contact with the body at a plurality of body/sensor interface points; and
the cavity in the holding fixture body is generally an inverted U-shape with the legs of the U tapering inward from the vertical by a predetermined angle.

6. The mounting apparatus of claim 5 wherein:
the resilient means urges the sensor into contact with the body with a normal force in accordance with the formula: $F_n = F_s/2 \sin \phi$
where:
$F_n =$ the normal force acting at the body/sensor interface points;
$F_s =$ the force applied by the resilient means on the sensor; and
$\phi =$ the predetermined angle of taper of the legs of the U-shaped cavity.

7. The mounting apparatus of claim 6 wherein:
a frictional resistance to sensor motion in the cavity results from contact between the resilient means and the sensor and between the body and the sensor in accordance with the formula: $R_f = F_s u_1/\sin \phi + F_s u_2$
where:
$R_f =$ frictional resistance to sensor motion;
$u_1 =$ static coefficient of friction between the sensor and the holding fixture;
$u_2 =$ static coefficient of friction between the sensor and the resilient means;
$F_s =$ force applied by the resilient means on the sensor; and
$\phi =$ the predetermined angle of taper of the legs of the U-shaped cavity.

8. A sensor mounting apparatus comprising:
a holding fixture body containing a cavity therein, the cavity having a U-shaped cross-section;
a wheel speed sensor mounted in the cavity, the sensor having a circular cross-section; and
resilient means cooperatingly mounted with the holding fixture for urging the sensor into contact with the body at a plurality of body/sensor interface points.

9. A sensor mounting apparatus comprising:
a holding fixture body containing a cavity therein, the cavity having a U-shaped partial inner peripheral surface;
a sensor having cylindrical outer peripheral surface; and
resilient means cooperatingly mounted with the holding fixture for urging the sensor into partial peripheral interfacing contact between the sensor peripheral surface and the cavity inner peripheral surface.

10. A sensor mounting apparatus comprising:
a holding fixture body containing a cavity therein, the cavity having U-shaped partial inner peripheral surface; and
resilient means cooperatingly mounted with the holding fixture at the opening of the U for providing an additional partial inner peripheral surface with the partial inner peripheral surface of the cavity.

* * * * *